United States Patent [19]
Phillips et al.

[11] Patent Number: 5,419,655
[45] Date of Patent: May 30, 1995

[54] COLLECTION OF LIQUID FROM BELOW-GROUND LOCATION

[75] Inventors: Steven J. Phillips; Robert G. Alexander, both of Kennewick, Wash.

[73] Assignee: Westinghouse Electric Corporation, Pittsburgh, Pa.

[21] Appl. No.: 99,862

[22] Filed: Aug. 2, 1993

[51] Int. Cl.⁶ .................................. B65G 5/00
[52] U.S. Cl. ............................ 405/52; 405/36; 405/128
[58] Field of Search .................. 405/59, 52, 128, 129, 405/53, 57, 58, 36, 50; 588/249

[56] References Cited

U.S. PATENT DOCUMENTS

| | | | |
|---|---|---|---|
| 2,947,147 | 8/1960 | Johnson | 405/59 X |
| 3,003,322 | 10/1961 | Jordan | 405/59 |
| 3,519,076 | 7/1970 | Walker | 405/59 X |
| 3,589,773 | 6/1971 | Dixon | 405/59 X |
| 4,190,072 | 2/1980 | Fernandez et al. | 405/59 X |
| 4,464,081 | 8/1984 | Hillier et al. | |
| 4,543,016 | 9/1985 | Tallard | |
| 4,701,072 | 10/1987 | Berezoutzky | 405/53 |
| 4,808,029 | 2/1989 | Grupping | 405/59 |
| 4,844,839 | 7/1989 | Manchak, Jr. | |
| 4,867,604 | 9/1989 | Bell | |
| 4,895,085 | 1/1990 | Chips | |
| 4,958,957 | 9/1990 | Berg et al. | |
| 5,067,850 | 11/1991 | Gray | |
| 5,092,709 | 3/1992 | Davis | |

FOREIGN PATENT DOCUMENTS

| | | |
|---|---|---|
| 3714713 | 11/1988 | Germany |
| 63-138022 | 6/1988 | Japan |

OTHER PUBLICATIONS

Design News, Jun. 7, 1993, pp. 62–63.

*Primary Examiner*—Dennis L. Taylor

[57] ABSTRACT

A method of retrieving liquid from a below-ground collection area by permitting gravity flow of the liquid from the collection area to a first closed container; monitoring the level of the liquid in the closed container; and after the liquid reaches a given level in the first closed container, transferring the liquid to a second closed container disposed at a location above the first closed container, via a conduit, by introducing into the first closed container a gas which is substantially chemically inert with respect to the liquid, the gas being at a pressure sufficient to propel the liquid from the first closed container to the second closed container.

19 Claims, 1 Drawing Sheet

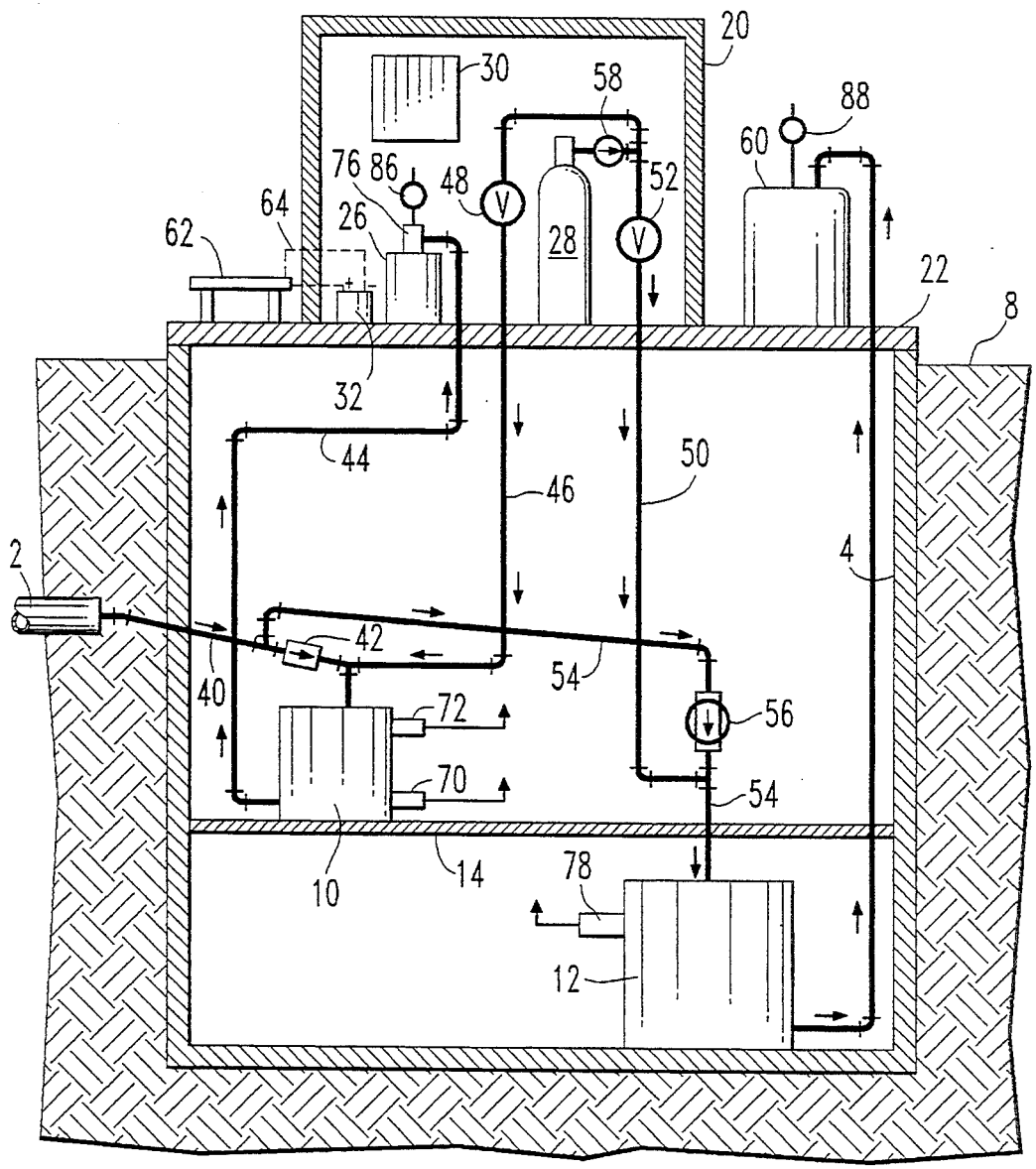
FIG. 1
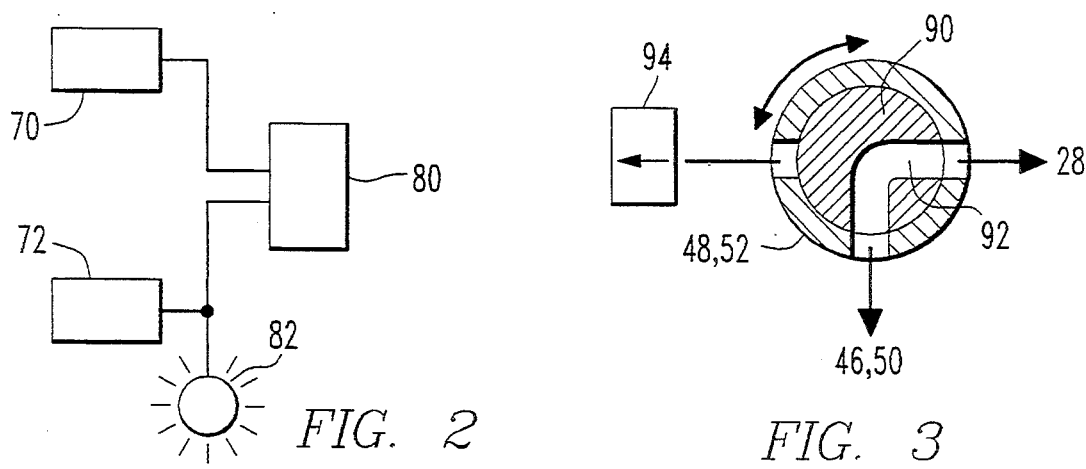
FIG. 2
FIG. 3

COLLECTION OF LIQUID FROM BELOW-GROUND LOCATION

ORIGIN OF THE INVENTION

This invention was conceived or first reduced to practice in the course of, or under Contract Number DE-ACOG-87RL10930 between the Westinghouse Hanford Company and the United States Government, represented by the Department of Energy. The United States Government may have rights in this invention.

BACKGROUND OF THE INVENTION

The present invention relates to collection and analysis of liquid from a below-ground location for analysis.

There exist various types of installations in which it is necessary, or at least desirable, to collect a liquid from a location which is not readily accessible for analysis. To cite one example, it is known to be desirable, and in some jurisdictions mandatory, to assure that leachate from landfills and similar structures does not contaminate surrounding soil or water supplies.

To this end, it has been proposed to provide landfills with membrane liner leachate collection systems or pan lysimeters, i.e. essentially a large basin buried under a representative portion of a landfill to underlie a mass of waste material which has possibly been backfilled, or covered with soil. The membrane liner or pan lysimeter will catch water and waste material components which percolate through the overlying portion of the landfill and will direct the water and any contaminants therein, i.e., the leachate, to an outfall pipe forming part of the membrane liner or lysimeter.

If a collection device such as a membrane liner or pan lysimeter is provided in a landfill, some means must be provided to bring the leachate to an accessible location. It is already known to bury a caisson or tube in the ground down to the membrane liner or lysimeter outfall pipe. A portable collection vessel is placed in the caisson or tube to receive leachate from the outfall pipe. Depending on design, a worker must climb down into the caisson, perhaps once each week, to retrieve the collection vessel. The caisson must be constructed to provide a safe environment and breathable atmosphere for the worker and each trip to retrieve a collection vessel and to replace that vessel with an empty one requires a certain time. Therefore, this approach to leachate collection has a cost and health risks which are not insignificant.

It is known in other arts to convey liquid from a below ground location to the ground surface using mechanical devices such as, for example, pumps.

However, the leachate recovered for testing must correspond chemically and physically to the liquid reaching the membrane liner or lysimeter; otherwise it will not permit an accurate determination of the effect of the landfill on surrounding soil and water. The procedures described above, including the manual collection procedure, provoke degradation, e.g. oxidation, of the leachate, which will falsify the analysis results. The analysis results can be further falsified by precipitation of contaminants in a sample and other reactions.

SUMMARY OF THE INVENTION

It is an object of the invention to retrieve valid leachate samples in a simple and inexpensive manner.

Another object of the invention is to minimize the time which operating personnel must devote to the retrieval operation.

A further object of the invention is to prevent changes from occurring in the chemical composition and physical state of leachate prior to analysis.

The above and other objects are achieved, according to the invention by a method of retrieving liquid from a below-ground collection area, composed of the steps of:
  permitting gravity flow of the liquid from the collection area to a first closed container;
  monitoring the level of the liquid in the closed container; and
  after the liquid reaches a given level in the first closed container, transferring the liquid to a second closed container disposed at a location above the first closed container, via a conduit, by introducing into the first closed container a gas which is substantially chemically inert with respect to the liquid, the gas being at a pressure sufficient to propel the liquid from the first closed container to the second closed container.

The combination of a closed system from the collection area to the second closed container, and the use of a chemically inert gas to propel the liquid assure that the liquid reaching the second closed container will be chemically identical to the liquid in the collection area.

BRIEF DESCRIPTION OF THE DRAWINGS

FIG. 1 is a simplified pictorial view of an embodiment of a system according to the invention.

FIG. 2 is a schematic diagram of one embodiment of timer and control unit 30.

FIG. 3 is a schematic diagram of an element employed in the embodiment of FIG. 1.

DESCRIPTION OF THE PREFERRED EMBODIMENTS

FIG. 1 shows a system according to the invention for retrieving leachate from a landfill. The landfill may be provided with a pan lysimeter or other collection structure such as disclosed, for example, in U.S. Pat. No. 5,092,709, although in the system according to the invention, the collection structure will underlie only a representative portion of the landfill. The collection structure here includes an outfall pipe 2 for the withdrawal of leachate from the collection structure.

The system includes a caisson or tube 4 which is substantially entirely below the level of ground surface 8. Caisson 4 contains a primary leachate collection vessel 10, preferably of stainless steel, and a leachate overflow collection vessel 12, preferably of stainless steel. Preferably, vessel 10 rests on a level or landing 14 built into caisson 4 at a level such that the top of vessel 10 is below pipe 2, while vessel 12 is below vessel 10.

Above ground there is provided a sample collection building, or instrument cabinet, 20, which may be built upon a cover 22 of caisson or tube 4. Building 20 houses a small, closed collection bottle 26, a pressurizer gas supply bottle 28, time/light control unit 30 and a battery 32 for supplying operating power to unit 30.

Pipe 2 is connected to a liquid inlet of vessel 10 via an inclined conduit 40 containing a one-way valve 42; an outlet of vessel 10, located near the bottom thereof, is connected to an inlet of bottle 26 via a conduit 44; bottle 28 is connected to the inlet of vessel 10 via a line 46 and a manually controllable valve and check valve 48; and bottle 28 is connected to the inlet of vessel 12 via a line 50 and a manually controllable valve and check valve 52. In addition, pipe 2 is connected to the inlet of vessel 12 via a line 54 and an electrically controllable one-way valve 56. A one-way valve 58 is connected to lines 46 and 50 to allow gas to flow to those lines from bottle 28. Valve 58 is further constructed to include a check valve which prevents the gas pressure to vessels 10 and 12 from exceeding a given limit.

Above ground there is also provided an overflow collection drum 60 which is preferably outside of building 20, and a solar panel 62 which is disposed to be exposed to direct sunlight and is connected by a cable 64 to maintain battery 32 charged. Battery 32 supplied operating power to all electrically operated devices of the system so that solar panel 62 allows the system to be completely autonomous.

Vessel 10 is equipped with two liquid level sensors; a lower level sensor 70; and an upper level sensor 72. Each level sensor has an output lead which is connected to unit 30. When liquid in vessel 10 reaches a first level, an output signal appears on the output lead of sensor 70. When liquid in vessel 10 reaches a second level which is higher than the first level, an output signal appears on the output lead of sensor 72.

When liquid in vessel 10 reaches the first level, the output signal from sensor 70 triggers a timer in unit 30. When the liquid in vessel 10 reaches the second level, the output signal from sensor 72 stops the timer, so that the timer stores an indication of the time taken for liquid in vessel 10 to go from the first level to the second level, and illuminates a signal light. In addition, since building 20 is intended to not be continuously attended, an indication signal may also be transmitted, via a wireless link, dedicated wire, telephone line, etc., to a regularly manned central station.

When a site operator enters building 20 and notes the existence of such an indication, he opens valve 48 to deliver an inert, preferably noble, gas, e.g., argon, to vessel 10 via a line 46, thus forcing leachate from vessel 10 into bottle 26 until a desired amount of leachate has been collected. Vessel 10 and bottle 26 are valved so that only leachate and inert gas can enter vessel 10 and bottle 26.

The delivery of liquid to bottle 26 takes place via a conventional coupler 76 which can disconnect bottle 26 from line 44 in a manner to leave bottle 26 sealed and line 44 filled with an inert atmosphere or leachate. Thus, from the time liquid enters vessel 10 to the time it is collected in bottle 26, it is maintained in an inert atmosphere which inhibits changes in its chemical composition and physical state. After bottle 26 is filled, it is removed for analysis and is replaced by an empty bottle which is connected to coupler 76. An empty bottle 26 preferably initially contains a vacuum or an inert gas.

If vessel 10 should become completely filled before arrival of a site operator, leachate will back up in line 40 until it reaches the level of the input end of line 54. Thereafter, leachate will flow by gravity through inclined line 54 and one-way valve 56 into vessel 12.

Vessel 12 is closed to permit transport of liquid to vessel 60 by pressurized gas from bottle 28. This transport may be effected manually, for example at periodic intervals, or in response to the amount of liquid delivered to bottle 26 or to a signal provided by a further level sensor 78 provided on vessel 12. The output signal from sensor 78 can be delivered to unit 30. This signal may indicate to the operator, or to an automated system, that vessel 12 is to be emptied.

Since liquid delivered to vessel 60 is not to be analyzed, that vessel need not be sealed.

Preferably, vessels 12 and 60 have a larger capacity than vessel 10 and bottle 26 is easily portable, for example having a capacity of 1 to 2 liters.

FIG. 2 shows one suitable embodiment of unit 30. The output line of sensor 70 is connected to a timer 80. An output signal from sensor 70 will start timer 80. The output line of sensor 72 is connected to timer 80 and a light 83. An output signal from sensor 72 will stop and hold timer 80 and illuminate light 82.

Reverting to FIG. 1, coupler 76 and drum 60 may each be provided with a respective check valve 86, 88 which prevents the pressure in bottle 26 and drum 60, respectively, from exceeding a preset value.

In further accordance with the invention, vessel 10 may be equipped with automatic analysis devices, such as a leachate Ph sensor, which deliver analysis data to unit 30.

To assure that inert gas which has been delivered to vessel 10 or 12 does not interfere with subsequent flow of leachate into the vessel, each of valves 48 and 52 is constructed to vent its associated line 46 or 50 when the valve is blocking the flow of inert gas from bottle 28. This is indicated schematically in FIG. 3, which shows valve 48, 52 to have a movable component 90 which is provided with a flow passage 92 and which is movable between a position in which passage 92 connects line 46, 50 to bottle 28 and a position in which passage 92 connects line 46, 50 to a check valve 94 which permits fluid flow in one direction from line 46, 50 to atmosphere whenever the pressure in line 46, 50 is above atmospheric. When gas is being delivered from bottle 28 to a line 46, 50, that line is isolated from valve 94.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of retrieving liquid from a below-ground collection area, comprising:
    permitting gravity flow of the liquid from the collection area to a first closed container;
    monitoring the level of the liquid in the first closed container; and
    after the liquid reaches a given level in the first closed container, transferring the liquid to a second closed container disposed at a location above the first closed container, via a conduit, by introducing into the first closed container a gas which is substantially chemically inert with respect to the liquid, the gas being at a pressure sufficient to propel the liquid from the first closed container to the second closed container.

2. A method as defined in claim 1 wherein the gas is a noble gas.

3. A method as defined in claim 2 wherein the liquid is leachate from a landfill.

4. A method as defined in claim 1 wherein the liquid is leachate from a landfill.

5. A system for retrieving liquid from a below-ground collection area, comprising:
 a first closed container disposed below ground;
 means connected to the collection area for permitting gravity flow of the liquid from the collection area to said first closed container;
 means connected to said first closed container for monitoring the level of the liquid in said first closed container; and
 means for transferring the liquid to a second closed container disposed at a location above said first closed container, via a conduit, after the liquid reaches a given level in said first closed container, by introducing into said first closed container a gas which is substantially chemically inert with respect to the liquid, the gas being at a pressure sufficient to propel the liquid from said first closed container to the second closed container.

6. A system as defined in claim 5 wherein said means for transferring comprise a mass of the gas which is substantially chemically inert with respect to the liquid.

7. A system as defined in claim 6 wherein said gas is a noble gas.

8. A system as defined in claim 6 wherein the below ground collection area is in a landfill.

9. A system as defined in claim 6 wherein said second closed container is located above ground.

10. A system as defined in claim 6 further comprising a first overflow container disposed below ground and connected to said means for permitting gravity flow for receiving liquid from the collection area, a second overflow container disposed above ground, and conduit means connecting said overflow containers together for permitting transfer of liquid from said first overflow container to said second overflow container, and wherein said means for transferring are connected to said first overflow container for introducing the gas into said first overflow container for effecting transfer of liquid from said first overflow container to said second overflow container.

11. A system as defined in claim 10 wherein said means for transferring comprise timer means for effecting transfer of liquid from said first overflow container to said second overflow container for a fixed time period.

12. A system as defined in claim 10 wherein said first and second overflow containers each has a larger capacity than said first closed container.

13. A system as defined in claim 5 wherein the below ground collection area is in a landfill.

14. A system as defined in claim 5 further comprising a first overflow container disposed below ground and connected to said means for permitting gravity flow for receiving liquid from the collection area, a second overflow container disposed above ground, and conduit means connecting said overflow containers together for permitting transfer of liquid from said first overflow container to said second overflow container, and wherein said means for transferring are connected to said first overflow container for introducing the gas into said first overflow container for effecting transfer of liquid from said first overflow container to said second overflow container.

15. A system as defined in claim 14 wherein said first and second overflow containers each have a larger capacity than said first closed container.

16. A method of retrieving liquid from a below-ground collection area, comprising:
 placing a first closed container having a liquid inlet below ground and below the collection area;
 providing a flow path from the collection area to the liquid inlet of the first closed container;
 causing gravity flow of the liquid from the collection area to the liquid inlet of the first closed container via the flow path;
 monitoring the level of the liquid in the first closed container; and
 after the liquid reaches a given level in the first closed container, transferring the liquid to a second closed container disposed at a location above the first closed container, via a conduit, by introducing into the first closed container a gas which is substantially chemically inert with respect to the liquid, the gas being at a pressure sufficient to propel the liquid from the first closed container to the second closed container.

17. A system as defined in claim 5 wherein: said means for monitoring are carried by said first closed container and produce a signal when the level of liquid in said first closed container reaches a first value; and said system further comprises an indicator connected to said means for monitoring for producing a detectable indication in response to the signal produced by said means for monitoring.

18. A system as defined in claim 5 wherein said first closed container has a liquid inlet and said means for permitting gravity flow comprise a conduit connected between the collection area and said liquid inlet and extending downwardly from the collection area to said liquid inlet, and a one-way valve contained in said conduit for permitting liquid to flow only in a direction from the collection area to said liquid inlet.

19. A method as defined in claim 1 wherein said step of transferring is carried out by propelling the liquid from the first closed container to the second closed container by a propelling force produced by the pressure of the gas, and the gas has a composition selected to inhibit changes in the chemical composition and physical state of the liquid which flows into the first closed container.

* * * * *